United States Patent

Rosser, Jr. et al.

[11] Patent Number: 5,823,003
[45] Date of Patent: Oct. 20, 1998

[54] PROCESS FOR HEAT RECOVERY IN A SORPTION REFRIGERATION SYSTEM

[75] Inventors: Frank S. Rosser, Jr., La Grange Park; Stephen R. Dunne, Algonquin, both of Ill.

[73] Assignee: UOP LLC, Des Plaines, Ill.

[21] Appl. No.: 850,539

[22] Filed: May 2, 1997

[51] Int. Cl.$^6$ .................................................. F25B 17/00
[52] U.S. Cl. ................................ 62/144; 62/480; 62/105
[58] Field of Search ............................. 62/101, 103, 104, 62/105, 106, 141, 142, 143, 144, 146, 476, 480, 481

[56] References Cited

U.S. PATENT DOCUMENTS

| | | | |
|---|---|---|---|
| 4,138,850 | 2/1979 | Tchernev | 60/641 |
| 4,479,364 | 10/1984 | Maier-Laxhuber | 62/141 |
| 4,548,046 | 10/1985 | Brandon et al. | 62/79 |
| 4,610,148 | 9/1986 | Shelton | 62/480 |
| 4,637,218 | 1/1987 | Tchernev | 62/106 |
| 4,660,629 | 4/1987 | Maier-Laxhuber | 165/104 |
| 5,279,359 | 1/1994 | Erickson | 165/104.12 |
| 5,333,471 | 8/1994 | Yamada | 62/476 |
| 5,388,637 | 2/1995 | Jones et al. | 165/104.12 |
| 5,477,705 | 12/1995 | Meunier | 62/480 |
| 5,518,977 | 5/1996 | Dunne et al. | 502/68 |
| 5,585,145 | 12/1996 | Maier-Laxhuber | 427/380 |

OTHER PUBLICATIONS

Aittomaecki, A. & Haerkoenen, M., Article "Internal Regeneration of the Adsorption Process" presented at Solid Sorption Refrigeration Symposium in Paris, France, Nov. 18–20, 1992.

Chang, S. & Roux, J.A., article "Thermodynamic Analysis of a Solar Zeolite Refrigeration System," in *Journal of Solar Energy Engineering*, Aug. 1985, vol. 107, pp. 189–194.

Meyers, Robert A., editor, Chapter 3.3 of Handbook of Petroleum Refining Processes, Second Edition, published by McGraw–Hill, NY, 1996.

*Primary Examiner*—William Doerrler
*Attorney, Agent, or Firm*—Thomas K. McBride; John G. Tolomei; Richard P. Silverman

[57] ABSTRACT

The present invention is a process for controlling a sorption cooling or heating process which employs an adsorption zone in fluid communication with a refrigeration circuit to pass desorbed vapor upon heating to a condenser and to adsorb refrigerant vapor from an evaporator when cooled. The process is cyclic and comprises heating the adsorption zone during a desorption step and cooling the adsorption zone during an adsorption step. The heating and cooling of the adsorption zone wherein a heat exchange zone is in intimate indirect thermal contact with the adsorption zone is provided during a cyclic process by alternating the flow of a working fluid at a hot source temperature or a working fluid at a cold source temperature through the heat exchange zone to provide the heating and cooling. It was discovered that by conserving hot working fluid at or above a reference temperature in a hot working medium reservoir, fluctuations in the heating requirements at the hot source can be minimized and significant cost savings could be achieved. The present invention can provide significant benefits in the refining and petrochemical process industry where product streams from catalytic reactions at elevated temperatures must be cooled to ambient conditions for storage or transport.

15 Claims, 1 Drawing Sheet

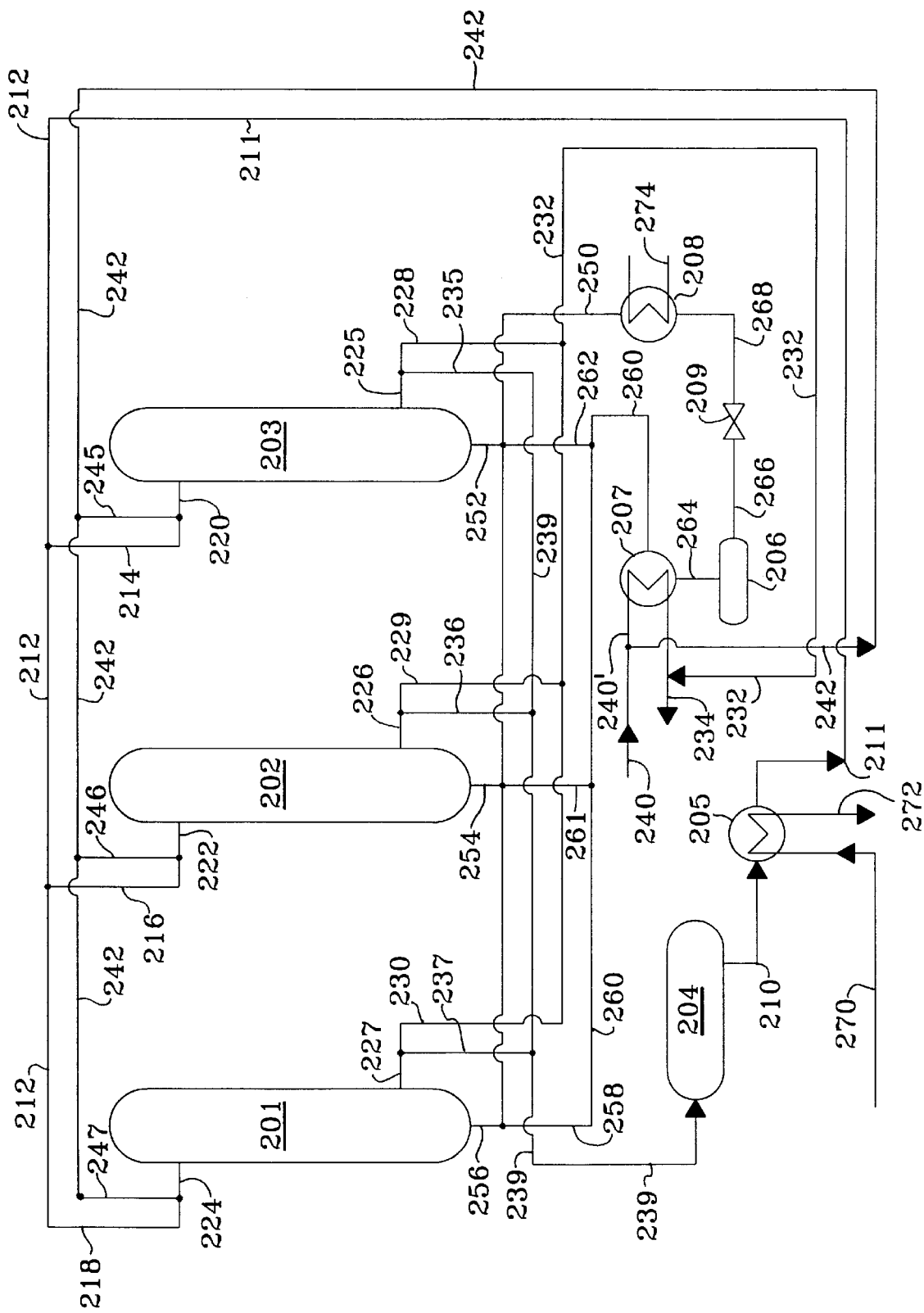

PROCESS FOR HEAT RECOVERY IN A SORPTION REFRIGERATION SYSTEM

FIELD OF THE INVENTION

The present invention relates to a process for sorption heating and cooling. More particularly, the present invention relates to a process for conserving energy in the operation of a multi-zone sorption cooling system.

BACKGROUND OF THE INVENTION

Heat driven heat pumps which use solid adsorbent beds to adsorb and desorb a refrigerant are known in the art. These solid adsorbent beds adsorb and desorb a refrigerant vapor in response to changes in the temperature of the adsorbent. One common example of such solid adsorbent material is a molecular sieve such as a zeolite. Other materials which exhibit this phenomena are silica gel, alumina, activated charcoal, and some metal salts. Most any liquid which can be vaporized can be employed as the refrigerant. Water is commonly used as a refrigerant when zeolite is the solid adsorbent.

In the operation of sorption cooling systems, generally there are two or more solid beds containing a solid adsorbent. The solid adsorbent beds desorb refrigerant when heated and adsorb refrigerant vapor when cooled. In this manner the beds can be used to drive the refrigerant around a heat pump system to heat or cool another fluid such as a process stream or to provide space heating or cooling. In the heat pump system, commonly referred to as the heat pump loop, the refrigerant is desorbed from a first bed as it is heated to drive the refrigerant out of the first bed and the refrigerant vapor is conveyed to a condenser. In the condenser, the refrigerant vapor is cooled and condensed. The refrigerant condensate is then expanded to a lower pressure through an expansion valve and the low pressure condensate passes to an evaporator where the low pressure condensate is heat exchanged with the process stream or space to be conditioned to revaporize the condensate. When further heating no longer produces desorbed refrigerant from the first bed, the first bed is isolated and allowed to return to the adsorption conditions. When the adsorption conditions are established in the first bed, the refrigerant vapor from the evaporator is reintroduced to the first bed to complete the cycle. Generally two or more solid adsorbent beds are employed in a typical cycle wherein one bed is heated during the desorption stroke and the other bed is cooled. The time for the completion of a full cycle of adsorption and desorption is known as the "cycle time." The heating and cooling steps are reversed when the beds reach the desired upper and lower temperature limits of the adsorption cycle. The upper and lower temperatures will vary depending upon the selection of the refrigerant fluid and the adsorbent. The efficiency in cooling is called the "coefficient of performance" (COP) and is generally the ratio of the cooling effect divided by the heat input. The thermodynamic aspects of developing a zeolite-water adsorption refrigeration unit are well known. An article entitled, "Thermodynamic Analysis of a Solar Zeolite Refrigeration System," by S. Chang and J. A. Roux, which appeared in the Journal of Solar Energy Engineering, August 1985, Volume 107, pages 189–194, provides a discussion of the main parameters, including adsorber properties.

U.S. Pat. No. 4,610,148 to Shelton discloses a heat driven heat pump system wherein a temperature gradient is established lengthwise in the solid adsorbent bed in order to establish a thermal wave in the bed. As a heat transfer fluid is circulated through the system by a reversible pumping means, the beds are cycled between an upper and a lower operating temperature, creating the thermal wave within the bed of solid adsorbent. The heat transfer fluid always flows serially from a heater through a bed heat exchanger heating that bed while cooling the heat transfer fluid. Then the heat transfer fluid is passed through the cooling heat exchanger to further cool the heat transfer fluid, and the further cooled heat transfer fluid is passed through the other bed heat exchanger to cool that bed while heating the heat transfer fluid. Finally, the thus heated heat transfer fluid is returned to the heater to raise the heat transfer fluid to the original temperature. The solid adsorbent beds are constructed of one or more tubes through which the heat transfer fluid is passed and around which the solid adsorbent is held by a housing shell. In a similar apparatus for use with an ammonia refrigerant, U.S. Pat. No. 5,388,637 discloses the use of a finned tube matrix comprising a bonded activated carbon and a resol bonder tightly adjoined to the fins of the tube to provide high rates of heat transfer between the refrigerant and the heat transfer fluid.

Some thermodynamic processes for cooling and heating by adsorption of a refrigerating fluid on a solid adsorbent use zeolite and other sorption materials such as activated carbon and silica gel. In these processes, the thermal energy from adsorbing zeolite in one zone is used to heat desorbing zeolite located in another zone. U.S. Pat. No. 4,138,850 relates to a system for solar heat utilization employing a solid zeolite adsorbent mixed with a binder, pressed, and sintered into divider panels and hermetically sealed in containers. The U.S. Pat. No. 4,637,218 to Tchernev relates to a heat pump system using zeolites as the solid adsorbent and water as the refrigerant wherein the zeolite is sliced into bricks or pressed into a desired configuration to establish an hermetically sealed space and thereby set up the propagation of a temperature front, or thermal wave through the adsorbent bed. The bricks used in U.S. Pat. No. 4,637,218 are preferably not more than 10 mm in thickness. U.S. Pat. No. 5,477,705 discloses an apparatus for refrigeration employing a compartmentalized reactor and alternate circulation of hot and cold fluids to create a thermal wave which passes through the compartments containing a solid adsorbent to desorb and adsorb a refrigerant.

U.S. Pat. No. 4,548,046 relates to an apparatus for cooling or heating by adsorption of a refrigerating fluid on a solid adsorbent. The operations employ a plurality of tubes provided with parallel radial fins, the spaces between which are filled or covered with solid adsorbent such as Zeolite 13X located on the outside of the tubes.

In an article by Aittomaecki, A. and Haerkoenen, M., titled, "Internal Regeneration of the Adsorption Process," and presented at the Solid Sorption Refrigeration Symposium—Paris, France, Nov. 18–20, 1992, the authors indicate that there is a draw back to the Tchernev/Shelton cycle which creates a thermal wave in the bed traveling in the direction of the flow of the heat transfer fluid. Aittomaecki et al. notes that the cycle time must be short enough to maintain the operation temperatures of the outflowing fluids at the desired level; however, short cycles decrease the net adsorption and lead to a decrease in the COP of the basic process. Thus, there are finite limits to the thermal wave processes which must have a cycle time long enough to maintain adsorbent regeneration efficiency, but short enough to maintain the overall COP.

U.S. Pat. No. 5,279,359 to Erickson discloses an apparatus and a process for sorption heat pumping using a multiplicity of intermittent cyclic triplex sorption modules. The cyclic triplex sorption modules comprise hermetically sealed tubes, each of which contains at least two solid sorbents and is filled with a refrigerant. The preferred refrigerant is ammonia and the solid sorbents are salts such as $BaCl_2$, $SiCl_2$, $CaCl_2$, $MnCl_2$, $FeCl_2$ and $SiBr_2$.

U.S. Pat. No. 4,660,629 to Maier-Laxhuber et al. discloses a continuous adsorption cooling device comprising a plurality of adsorption containers filled with adsorbent wherein the adsorption containers are rotated through flow segments which form passageways for a heat carrier stream. The adsorption containers contain an adsorption substance from which an operating substance is extracted by absorbing heat from a heat carrier flow and into which the operating substance is readsorbed, emitting heat to a further heat carrier flow. In U.S. Pat. No. 5,585,145, filed Feb. 16, 1995, Maier-Laxhuber disclose a method for coating a heat exchanger surface with a solid adsorbent.

In adsorber/generator based cooling systems the most significant parameter is the overall heat transfer coefficient between the adsorbent bed and the cooling or heating gases per unit weight of adsorbent in the system. This parameter has been related in the literature to the cooling power per kilogram of adsorbent. The higher the cooling power, the more efficient the adsorber/generator system. Current systems are limited by requiring a high adsorbent regenerator temperature or a long cycle time to achieve relatively low cooling power values.

Prior methods of using zeolite adsorbents in devices for cooling or heating by adsorption of a refrigerating fluid on a solid adsorbent have been inefficient and difficult to prepare. Those methods of preparation included cutting natural rock into thin bricks and mounting these bricks on to heat exchange surfaces or casting powdered zeolites and mixtures thereof with clays into panels or slabs for direct contact with fluids. Prior devices have sought to minimize heat transfer losses in systems for sorption cooling by employing flat containers filled with adsorbent suspended in heat carrier streams or with slabs of adsorbent wired or mounted next to heat transfer surfaces. In one case, finned tubing was employed as a support for a resin bonded adsorbent to provide more thermal conductivity to the adsorbent. Many of these devices incorporated further flow enhancers such as sorbate conduits, weirs, valves, and wicks to establish maximum contact of the operating fluid and the adsorbent with heat exchange surfaces. These devices are limited by their ability to maintain the regenerating efficiency of the adsorbent. Devices are sought which simplify the manufacture of the entire sorption cooling system and improve the overall system power per unit-mass of sorbent.

It is the object of the instant invention to provide an improved sorption cooling system for use in waste heat recovery, space heating, and air conditioning systems which is not limited by the regeneration efficiency of the adsorbent.

SUMMARY OF THE INVENTION

It was discovered that significant savings in capital and operating costs of sorption cooling/heating systems may be realized when the process of the present invention is employed. By preserving and recirculating hot working fluid to those sorption zones undergoing desorption, the overall heating requirements can be reduced by a factor of 4–5 times over systems which do not have heat recovery systems on the working fluid side of the sorption cooling process.

The present invention relates to a process for controlling a sorption cooling system. The process comprises a plurality of sorption zones wherein a first sorption zone of the plurality of sorption zones is being heated in a desorption mode and a second sorption zone of the plurality is being cooled in an adsorption mode. Each sorption zone has a heat exchange zone through which a heat transfer medium is passed to provide heating or cooling to an adsorption zone. The adsorption zone contains a solid adsorbent. The heat exchange zone is in intimate thermal contact with the adsorption zone. Each adsorption zone is in fluid communication with a condenser and an evaporator in a sorption refrigeration circuit such that a desorbed refrigerant vapor stream can flow from the adsorption being heated into the condenser a cooled condensate stream can flow from the condenser to an evaporator, and a vaporized refrigerant stream from the evaporator can flow into the adsorption zone being cooled. A hot working fluid stream at a hot source temperature is passed through the heat transfer zone of the first sorption zone and a hot exit stream at an exit temperature is withdrawn. The exit temperature is compared to a reference temperature and the hot exit stream is passed to a hot heat transfer medium reservoir when the exit temperature is greater than or equal to the reference temperature. A reservoir working fluid stream is withdrawn from the hot heat transfer medium reservoir and heated to provide the hot working fluid stream. A cold stream is passed through the heat transfer zone of the second sorption zone and a warm exit stream is withdrawn. The hot exit stream and the warm exit stream are admixed when the exit temperature is below the reference temperature.

BRIEF DESCRIPTION OF THE DRAWING

The drawing is a schematic block flow diagram of a sorption cooling system of the present invention employing a hot working reservoir.

DETAILED DESCRIPTION OF THE INVENTION

Sorption cooling systems are generally designed for a combination of the sorbent and a refrigerant because this combination establishes the adsorption and desorption temperatures which the sorbent must attain to either adsorb the refrigerant or desorb the refrigerant. In addition, because sorbent loading is dependent on the concentration of the refrigerant over the adsorbent at any point in the cycle, the selection of the refrigerant effectively establishes the pressure range of operation in the sorption refrigeration circuit. For example, a zeolite-water pair effectively sets the temperature range between the adsorption temperature and the desorption temperature at between about 0° C. and about 200° C. and the operating pressure within the refrigeration circuit from about 0.5 kPa (5 torr) to about 4 kPa (40 torr). When ammonia or propane is employed as the refrigerant over zeolite, the operating pressure ranges from about 315 kPa (45 psia) to about 1.2 MPa (165 psia).

Adsorbents may be employed in packed beds with heat transfer surfaces such as tubes or channels passing therethrough, or the adsorbent may be applied directly to heat transfer surfaces such as tubes or plates. When the adsorbent is applied directly to the heat transfer surfaces as disclosed in Dunne et al. in U.S. Pat. No. 5,518,977, higher heat and mass transfer rates are achievable, which results in a higher overall efficiency.

Preferably the adsorbent of the present invention is disposed in an adsorbent-substrate composite which bonded to the surface of the metal forming a coating consisting essentially of the adsorbent and a binder. These coatings provide a high surface area as well as a minimum diffusion path for the components adsorbed on the adsorbent and hence, superior rates of adsorption compared to pellets or beaded forms of adsorbent. Moreover, the adsorbent coatings have excellent physical durability and are resistant to flaking. Furthermore, despite differences in the thermal expansion properties between the adsorbent and the metallic substrate, the adsorbent coatings of the present invention advantageously retain their physical integrity even after repeated thermal cycling. In addition, when the present invention is employed in heat transfer equipment and the adsorbent layer has a uniform thickness ranging from 0.1 to 3.0 mm, and preferably the uniform thickness ranges from 0.1 to 1.2 mm, the adsorbent coating provides an acceptably small thermal resistance. With the very small thermal resistance, the adsorbent zones of the present invention do not exhibit the thermal inertia or thermal wave property of the prior art. In the present invention, there is essentially no difference between the temperature of the adsorbent at an inlet end of a section of adsorbent coated tubing and the temperature at an outlet end of the same section. Thus, the temperatures of the coated tubing is essentially the same across the entire length of the adsorbent coated tubing.

It is believed that the high specific power of the present invention is due in large part to the use of relatively low inventories of molecular sieve in the adsorption zones which are in intimate thermal contact with the heat transfer zone of each sorption zone. The term "specific power" means the total cooling power divided by the adsorbent inventory where the total cooling power is the rate at which heat is removed from the system. When coatings of molecular sieve materials are employed on the heat transfer surfaces, the amount of heat transferred to the molecular sieve per unit time is dependent upon the thickness of the adsorbent material. The thickness of the adsorbent material relates to the sorption cooling process, in particular to the regeneration efficiency, by providing heat transfer resistance to the transfer of heat from the hot fluid to the molecular sieve and by providing mass transfer resistance to the desorbed refrigerant. Both the heat transfer resistance and the mass transfer resistance of the molecular sieve increase by the square of the thickness of the molecular sieve coating on the heat transfer surface. In fixed beds, or matrices of adsorbents where thermal waves are established, only a small portion along the length of the heat transfer surface (or length of bed) is actively employed at the appropriate desorption conditions. In the present invention, essentially the entire adsorption zone is actively employed by creating an essentially uniform temperature throughout the adsorbent zone. The uniform temperature profile performance of the coated heat exchange surfaces of the present invention was discovered by observing the differences between the inlet and the outlet heat transfer fluid temperatures at the beginning of the desorption step. It was found that the inlet and outlet temperature of the heat transfer fluid flowing through sections of coated tubes became essentially equivalent within 15 to 30 seconds of the introduction of the heat transfer fluid. This indicated that essentially the entire adsorbent coated surface was in active use at the desorption condition for essentially the entire desorption stroke. In contrast, a thermal wave process only employs that portion of the adsorbent at the crest of the thermal wave and the length of the desorption stroke must be sufficient to travel the entire length of the bed. Thus, the present invention achieves a greater cooling power by actively employing a greater mass of adsorbent (that is essentially the entire adsorbent zone) in short cycle times such as about 50 seconds up to about 480 seconds.

In accordance with the present invention, the adsorbents are applied to the inside or outside surfaces of tubes for use in the cooling and heating by adsorption of a refrigerating fluid by the method disclosed in U.S. Pat. No. 5,518,977 hereby incorporated by reference. The preferred tubes are thin-walled and may have a plurality of fins disposed on the outside surface of the tubes. The coated tube zones or adsorbent sections are typically evacuated to a high vacuum of at least 1 micron of mercury at a temperature of at least 350° C. for a period of at least about 2 to 4 hours; filled with a refrigerant such as water, ammonia, sulfur hexafluoride, light alcohols and mixtures thereof; and sealed in a closed system by providing a closed refrigerant circuit comprising a reservoir, an isolation valve, an evaporator, and a condenser. Preferably, the adsorbent is selected from the group consisting of Y-54, Y-74, Y-84, Y-85, calcined rare earth exchanged LZ-210 at a framework $SiO_2/Al_2O_3$ mol equivalent ratio of less than about 7.0. A suitable working fluid may be selected from materials which remain the same phase over the range of temperature between the hot source and the cold source temperatures. The working fluid may be selected from the group consisting of water, alcohols, glycols, hydrocarbons, and mixtures thereof. Hydrocarbon fluids suitable for working fluids include process streams in refinery and petrochemical plants as stabilized product streams from catalytic conversion processes.

DETAILED DESCRIPTION OF THE DRAWING

The process of the present invention is hereinafter described with reference to the drawing which illustrates various aspects of the present invention. It is to be understood that no limitation to the scope of the claims which follow is intended by the following description. Those skilled in the art will recognize that these process flow diagrams have been simplified by the elimination of many necessary pieces of process equipment including valves, some heat exchangers, process control systems, pumps, fractionation column overhead and reboiler systems, etc. It may also be readily discerned that the process flow presented in the drawings may be modified in many aspects without departing from the basic overall concept of the invention. For example, the number of heat exchangers and valves shown in the drawings have been held to a minimum for purposes of simplicity. Those skilled in the art will recognize that the choice of heat exchange methods employed to obtain the necessary heating and cooling at various points within the process is subject to a large amount of variation as to how it is performed. Accordingly, there exists many possibilities for indirect heat exchange between different process streams. Depending on the specific location and circumstance of the installation of the subject process, it may also be desired to employ heat exchange against steam, hot oil, or process streams from other processing units not shown on the drawings.

Referring to the drawing, a hot working fluid stream at a hot source temperature in line 211 is passed to the hot working fluid header 212 and on to a heat transfer zone in sorption zone 203 via line 214 and line 220. In sorption zone 203 which comprises the heat transfer zone in intimate thermal contact with an adsorption zone containing a solid adsorbent, a refrigerant which has been previously adsorbed on the adsorbent is desorbed as the hot working fluid stream is introduced which subsequently results in the cooling of the hot working fluid stream. As a result, a hot exit stream is withdrawn from the heat exchange zone of sorption zone 203 in line 225 at an exit stream temperature reduced relative to the hot source temperature. If the exit stream temperature is equal to or greater than a reference temperature, the hot exit stream is passed via lines 225 and line 235 to the hot exit stream header 239 and returned to a hot exit stream reservoir, or surge tank 204. Although not shown on the drawing, a pump is required to circulate the heat transfer fluid through the system. This circulation pump can be located at the outlet of the hot exit stream reservoir 204. If the hot exit stream is less than the reference temperature, then the hot exit stream is passed via line 225 and line 228 to the cold working fluid stream exit header 232 and withdrawn from the system in line 234. At the beginning of the desorption cycle, the heat exchange zone of sorption zone 203 contains working fluid which has a temperature lower than the hot working fluid temperature having just completed the adsorption process and during which step a cold working fluid was passed through the heat transfer zone. Therefore, at the beginning of the desorption mode, the temperature of the hot exit fluid is below the reference temperature and is, therefore, withdrawn from the system. As the desorption proceeds in sorption zone 203, the temperature of the hot exit stream rises above the reference temperature and at that point, the hot exit stream is recycled to the hot working fluid reservoir 204. On the adsorption zone side of sorption zone 203, during desorption, a desorbed refrigerant vapor is evolved in the sorption zone and passes through line 252 and line 262 to a desorption vapor header 260. The desorbed vapor continues to pass through the desorption header to condenser 207 wherein the desorbed vapor is cooled to provide a condensate stream which is passed in line 264 to accumulator 206. The condensate stream at the condenser pressure is passed via line 266 to a pressure, separation valve or isolation valve 209 which permits the condensate pressure to be reduced to an evaporation pressure in line 268 to provide a reduced pressure condensate stream. The reduced pressure condensate stream is passed in line 268 to evaporator 208 which is heated by steam, a heating medium, or some other heat source provided in line 274 to produce a refrigerant vapor stream in refrigerant vapor header 250. The refrigerant vapor is passed via the refrigerant vapor header 250 to line 256 where the refrigerant vapor is permitted to enter the adsorption zone of sorption zone 201 which is undergoing the adsorption stroke or adsorption mode of the sorption cooling cycle. During the adsorption mode, a cold working fluid stream originating in line 240 and passed to the cold fluid header 242 is passed to the heat transfer zone of sorption zone 201 via line 247 and line 224. Within the heat transfer zone of sorption zone 201 which is in intimate indirect thermal contact with the adsorption zone in sorption zone 201, the refrigerant vapor is adsorbed on the adsorbent within the adsorption zone and the subsequent heat released during adsorption is transferred to the cold working fluid stream which is withdrawn from sorption zone 201 as a warm exit stream in line 227 at a warm exit temperature. If the warm exit temperature is above the reference temperature, the warm exit stream is passed via line 227 and line 237 to the hot working fluid return header 239 and passed via line 239 to the hot working fluid reservoir 204. If the warm exit stream temperature is below the reference temperature, the warm exit stream is passed via line 227 and line 230 to the cold working fluid return header 232 and withdrawn from the system via line 234. At the beginning of the adsorption mode, the warm exit stream temperature is below the reference temperature because sorption zone 201 would have just completed the desorption step and a cool down step in preparation for the beginning of the adsorption step.

Sorption zone 202 represents an intermediate sorption zone or any number of sorption zones which may be in some degree of either the adsorption step of the desorption step in relation to sorption zones 201 and 203. During an adsorption mode relative to sorption zone 202, the cold working fluid would be passed from the cold working fluid header 242 and line 246 and line 222 to the heat exchange zone of sorption zone 202 to maintain the adsorption zone at an adsorption temperature and pressure effective to adsorb the refrigerant. The warm exit stream is withdrawn from sorption zone 202 in line 226, and if the temperature of the warm exit stream is greater than the referenced temperature, the warm exit stream is passed via line 226 and line 236 to the hot working fluid return header 239 and on to the hot working fluid reservoir 204. If the warm exit stream is less than the reference temperature, the warm exit stream is withdrawn from the system via line 226, line 229, cold return header 232 and line 234. When sorption zone 202 is in the desorption mode, the hot working fluid is passed from the hot working fluid header 212 via lines 216 and 222 to sorption zone 202 to maintain the adsorption zone at a desorption temperature which is effective to desorb the refrigerant from the adsorbent, and the hot exit stream is withdrawn via line 226. The hot exit stream from the sorption zone 202 is returned either to the hot working fluid reservoir 204 or is withdrawn from the system in line 234 in a manner similar to that described hereinabove. When sorption zones 201 and 202 are in the adsorption mode, refrigerant vapor is passed to each of the sorption zones via line 256 or line 254, respectively. When sorption zones 201 and 202 are operated in the desorption mode, the desorbed vapor is withdrawn via lines 256 and 258, or lines 254 and 462, respectively, to return the desorbed vapor to the desorption header to 260. Heat from a waste stream or a stack gas in line 270 is employed in exchanger 205 to heat reservoir working fluid withdrawn from the working fluid reservoir 204 in line 210 to the hot source temperature of the hot working fluid in line 211. The cold working fluid in line 240 enters at a cold working fluid temperature. The reference temperature referred to hereinabove is a temperature selected within the bounds of the hot source temperature and the cold source temperature. In this manner, there can be any number of sorption zones in various stages of adsorption or desorption in simultaneous operation, and the above process results in significant energy savings by returning and reusing the heat of the hot exit stream or the warm exit stream at the specific point in the sorption coating process when such heat is useful.

Preferably, the number of sorption zones in operation in the present invention may range from about two to twenty, and more preferably, the number of sorption zones in the operation of the present invention will range from about 2 to about 6. The reference temperature in the present invention will be any temperature between the hot source temperature and the cold source temperature. The exact selection of a reference temperature will vary somewhat with the efficiency of the heat exchangers in the process and the nature of the working fluid. Preferably, the reference temperature will be a temperature which is greater than the cold source temperature by at least 20 percent of the difference between the cold source temperature and the hot source temperature.

The present invention will provide significant benefits to the refinery and petrochemical industries where the sorption refrigeration system can provide low cost cooling and the working fluids are selected from a waste stream or stabilized product streams withdrawn from catalytic conversion processes such as catalytic reforming, catalytic cracking, hydroprocessing catalytic condensation, and other similar processes wherein catalytic reactions occur at elevated temperatures and product streams must be cooled to ambient conditions for storage and transport.

EXAMPLES

The following examples are only used to illustrate the present invention and are not meant to be limiting.

EXAMPLE I

The performance of a sorption cooling system employing 6 sorption zones wherein each of the sorption zones includes a heat exchange zone in intimate thermal contact with an adsorption zone in intimate thermal contact with an adsorption zone is determined based on the heating requirement for reheating the hot working fluid. The adsorption zone comprises a plurality of finned tubes coated with a thin layer of Y-zeolite adsorbent such as Y-54 or Y-74 on the outside surface of the tubes. The heat transfer zone comprises the inside surface of the finned tubes. The refrigerant is water vapor and the hot and cold working fluid was hot water at a hot source temperature of about 127° C. (260° F.) and a cold source temperature of about 38° C. (100° F.). With a cycle time of about 3 minutes in which all six beds completed an adsorption step and a desorption step, the average hot water return temperature is about 47° C. (116° F.) and the COP, coefficient of performance, is about 0.126. The sorption cooling system of Example I required about 2274 k joules/cycle (2155 BTU/cycle) to restore the hot water return to the hot source temperature.

EXAMPLE II

The performance of a six sorption zone sorption cooling system of the present invention with a similar configuration to Example I and employing a hot working fluid reservoir as illustrated in the Fig. to conserve hot working fluid is developed for the same boundary conditions and adsorbent as Example I. The adsorption zone comprises a plurality of finned tubes coated with a thin layer of Y-zeolite adsorbent such as Y-54 or Y-74 on the outside surface of the tubes. The heat transfer zone comprises the inside surface of the finned tubes. The refrigerant is water vapor and the hot and cold working fluid was hot water at a hot source temperature of about 127° C. (260° F.) and a cold source temperature of about 38° C. (100° F.). Six beds were operated with a cycle time of about 3 minutes. At a reference temperature of about 93° C. (200° F.) or above, the hot exit stream, or warm exit stream, withdrawn from the heat transfer zones of each sorption zone is returned or recycled to the hot working fluid reservoir. The average hot exit stream temperature over a cycle is determined to be about 108° C. (228° F.), corresponding to a reheating requirement of about a 500 k joule/cycle (475 BTU/cycle) and a COP of 0.569.

EXAMPLE III

Comparison of Results

The advantage of the present invention is shown by comparing the results of Example I (without the hot working fluid reservoir) to the results of Example II with the hot working fluid reservoir. The results of Example II indicate a higher hot working fluid exit temperature, a 450% improvement in the COP over the system without the hot fluid reservoir, and a reduction in the heat input requirement for the process of Example II by a similar percentage.

We claim:

1. A process for controlling a sorption cooling system comprising:

a) a first sorption zone of a plurality of sorption zones undergoing heating in a desorption mode and a second sorption zone of the plurality of sorption zones undergoing cooling in an adsorption mode of a plurality of sorption zones, each sorption zone of the plurality of sorption zones having a heat exchange zone through which a heat transfer medium is passed to provide heating or cooling and an adsorption zone containing a solid adsorbent, said heat exchange zone being in intimate thermal contact with said adsorption zone, each adsorption zone being in fluid communication with a condenser and an evaporator in a sorption refrigeration circuit such that a desorbed refrigerant vapor stream can flow from the adsorption zone being heated into the condenser, a cooled condensate stream can flow from the condenser to the evaporator and a vaporized refrigerant stream from the evaporator can flow into the adsorption zone being cooled;

b) passing a hot working fluid stream at a hot source temperature through the heat transfer zone of the first sorption zone and withdrawing a hot exit stream at an exit temperature;

c) comparing the exit temperature to a reference temperature and passing the hot exit stream to a hot heat transfer medium reservoir when the exit temperature is greater than or equal to the reference temperature and heating a reservoir working fluid stream withdrawn from said reservoir to provide the hot working fluid stream; and d) passing a cold stream through the heat transfer zone of said second sorption zone and withdrawing a warm exit stream, and admixing the hot exit stream with the warm exit stream when the exit temperature is below the reference temperature.

2. The process of claim 1 wherein the reference temperature comprises a temperature range bounded by the hot source temperature and the cold source temperature.

3. The process of claim 2 wherein the hot source temperature comprises a temperature between about 80° C. and about 300° C.

4. The process of claim 2 wherein the cold source temperature comprises a temperature range between about 0° C. and about 50° C.

5. The process of claim 1 wherein the adsorbent is selected from the group consisting of silica gel, zeolite molecular sieve, activated carbon, and mixtures thereof.

6. The process of claim 5 wherein said zeolite molecular sieve comprises zeolite A, zeolite X, zeolite Y, and mixtures thereof.

7. The process of claim 6 wherein the zeolite Y is selected from the group consisting of Y-54, Y-74, Y-84, Y-85, calcined rare earth exchanged LZ-210 at a framework $SiO_2/Al_2O_3$ mol equivalent ratio of less than about 7.0.

8. The process of claim 1 wherein the refrigerant vapor is selected from the group consisting of water, ammonia, sulfur hexafluoride, light alcohols, and mixtures thereof.

9. The process of claim 1 wherein the working fluid is selected from the group consisting of water, alcohols, glycols, hydrocarbons, and mixtures thereof.

10. The process of claim 1 wherein the plurality of sorption zones comprises from about 2 to about 20 sorption zones.

11. The process of claim 1 further comprising passing the hot exit stream through a multi-port valve prior to passing the hot exit stream to said reservoir.

12. The process of claim 11 wherein the multi-port valve is a 3-way valve.

13. The process of claim 1 wherein the reference temperature comprises a temperature which is greater than the cold source temperature by at least 20 percent of the difference between the hot source temperature and the cold source temperature.

14. The process of claim 1 wherein the working fluid comprises a stabilized product stream withdrawn from a refinery or petrochemical catalytic conversion process.

15. The process of claim 14 wherein the refinery or petrochemical catalytic conversion process is selected from the group of catalytic reforming, catalytic condensation, catalytic cracking, and hydroprocess.

* * * * *

UNITED STATES PATENT AND TRADEMARK OFFICE
CERTIFICATE OF CORRECTION

PATENT NO. : 5,823,003
DATED : October 20, 1998
INVENTOR(S) : Frank S. Rosser, et al It is certified that error appears in the above-identified patent and that said Letters Patent is hereby corrected as shown below:

Column 10, line 31, please delete the word "below" and replace it with the word --above--.

Col. 4, line 26, please replace the last sentence with the following "The hot stream and the warm exit stream are admixed when the exit temperature is above the reference temperature."

Signed and Sealed this

Twenty-third Day of February, 1999

Q. TODD DICKINSON

*Attest:*

*Attesting Officer*

*Acting Commissioner of Patents and Trademarks*